United States Patent
Wu et al.

(10) Patent No.: US 12,236,194 B2
(45) Date of Patent: Feb. 25, 2025

(54) WIREFRAME GENERATION

(71) Applicant: INTERNATIONAL BUSINESS MACHINES CORPORATION, Armonk, NY (US)

(72) Inventors: Zhaoqi Wu, Shanghai (CN); Yi Fang Chen, DaLian (CN); Zhi Wang, Shanghai (CN); Yi Qun Zhang, Shanghai (CN); Yan Du, Beijing (CN); Li Na Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 18/048,064

(22) Filed: Oct. 20, 2022

(65) Prior Publication Data

US 2024/0135102 A1 Apr. 25, 2024
US 2024/0232533 A9 Jul. 11, 2024

(51) Int. Cl.
*G06F 40/295* (2020.01)
*G06F 40/216* (2020.01)
*G06N 3/08* (2023.01)

(52) U.S. Cl.
CPC .......... *G06F 40/295* (2020.01); *G06F 40/216* (2020.01); *G06N 3/08* (2013.01)

(58) Field of Classification Search
CPC ....... G06F 40/295; G06F 40/216; G06N 3/08; G06N 3/045
See application file for complete search history.

(56) References Cited

U.S. PATENT DOCUMENTS

| | | | |
|---|---|---|---|
| 2019/0220749 A1* | 7/2019 | Feng | G06N 3/088 |
| 2019/0250891 A1 | 8/2019 | Kumar | |
| 2019/0317739 A1 | 10/2019 | Turek | |
| 2019/0332358 A1 | 10/2019 | Ganesh | |
| 2021/0064921 A1* | 3/2021 | Carbune | G06V 20/30 |
| 2021/0240933 A1* | 8/2021 | Song | G06F 40/205 |
| 2022/0188520 A1* | 6/2022 | Iso-Sipila | G06F 40/295 |

OTHER PUBLICATIONS

Cabot, "AI-based tools to transform interface design mockups into ready-to-use UI code", MOdeling LAnguages, Jan. 25, 2022, 10 pages.

Gupta et al., "LayoutTransformer: Layout Generation and Completion with Self-attention", https://arxiv.org/abs/2006.14615, Submitted on Jun. 25, 2020, 18 pages.

(Continued)

*Primary Examiner* — Abul K Azad
(74) *Attorney, Agent, or Firm* — Kristofer Haggerty (57) ABSTRACT

A method of this disclosure may include performing a named entity recognition on text information related to requirements for a wireframe by a first artificial intelligence (AI) model, so as to extract entities and relations of the entities from the text information. The method may further comprise inputting the extracted entities and relations to a second AI model to generate the wireframe, wherein the second AI model is trained so that a difference between resultant relations of the entities of the generated wireframe and the extracted relations of the entities from the first AI model is decreased.

20 Claims, 3 Drawing Sheets

(56) References Cited

OTHER PUBLICATIONS

Jyothi et al., "LayoutVAE: Stochastic Scene Layout Generation From a Label Set", Submitted on Jul. 24, 2019, https://arxiv.org/abs/1907.10719, 11 pages.
Li et al., "Auto Completion of User Interface Layout Design Using Transformer-Based Tree Decoders", arXiv:2001.05308v1 [cs.HC] Jan. 14, 2020, 11 pages.
Li et al., "Layoutgan: Generating Graphic Layouts With Wireframe Discriminators", Published as a conference paper at ICLR 2019, arXiv:1901.06767v1 [cs.CV] Jan. 21, 2019, 16 pages.

* cited by examiner

WIREFRAME GENERATION

BACKGROUND

The present invention relates to computer technology, and more specifically, to wireframe generation.

With the rapid development of information technology, user interface (UI) design becomes a key to attract new customers and keep them there. UI is a link between users and products, and UI design is a complicated process to reach such goal. Before starting to design a UI, designers should analyze customer requirements to understand their background, context, goals, etc. A wireframe of the UI is needed to decide the way the information to be presented in the UI and how users can interact with the products through the UI.

SUMMARY

According to a first aspect of the present invention, there is provided a computer implemented method including maintaining a graphical user interface to a software development environment, receiving a user input defining an element to be searched with context, extracting information from the software development environment relating to the software development environment and/or relating to the element, creating a search string including the element and the extracted information, supplying the created search string to a search interface, receiving a search result for the created search string, and outputting the search result for the created search string.

According to a second aspect of the present invention, there is provided a data processing system including a processor arranged to maintain a graphical user interface to a software development environment, receive a user input defining an element to be searched with context, extract information from the software development environment relating to the software development environment and/or relating to the element, create a search string including the element and the extracted information, supply the created search string to a search interface, receive a search result for the created search string, and output the search result for the created search string.

According to a third aspect of the present invention, there is provided a computer program product for controlling a data processing system including a processor, the computer program product including a computer readable storage medium having program instructions embodied therewith, the program instructions executable by the processor to cause the processor to maintain a graphical user interface to a software development environment, receive a user input defining an element to be searched with context, extract information from the software development environment relating to the software development environment and/or relating to the element, create a search string including the element and the extracted information, supply the created search string to a search interface, receive a search result for the created search string, and output the search result for the created search string.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
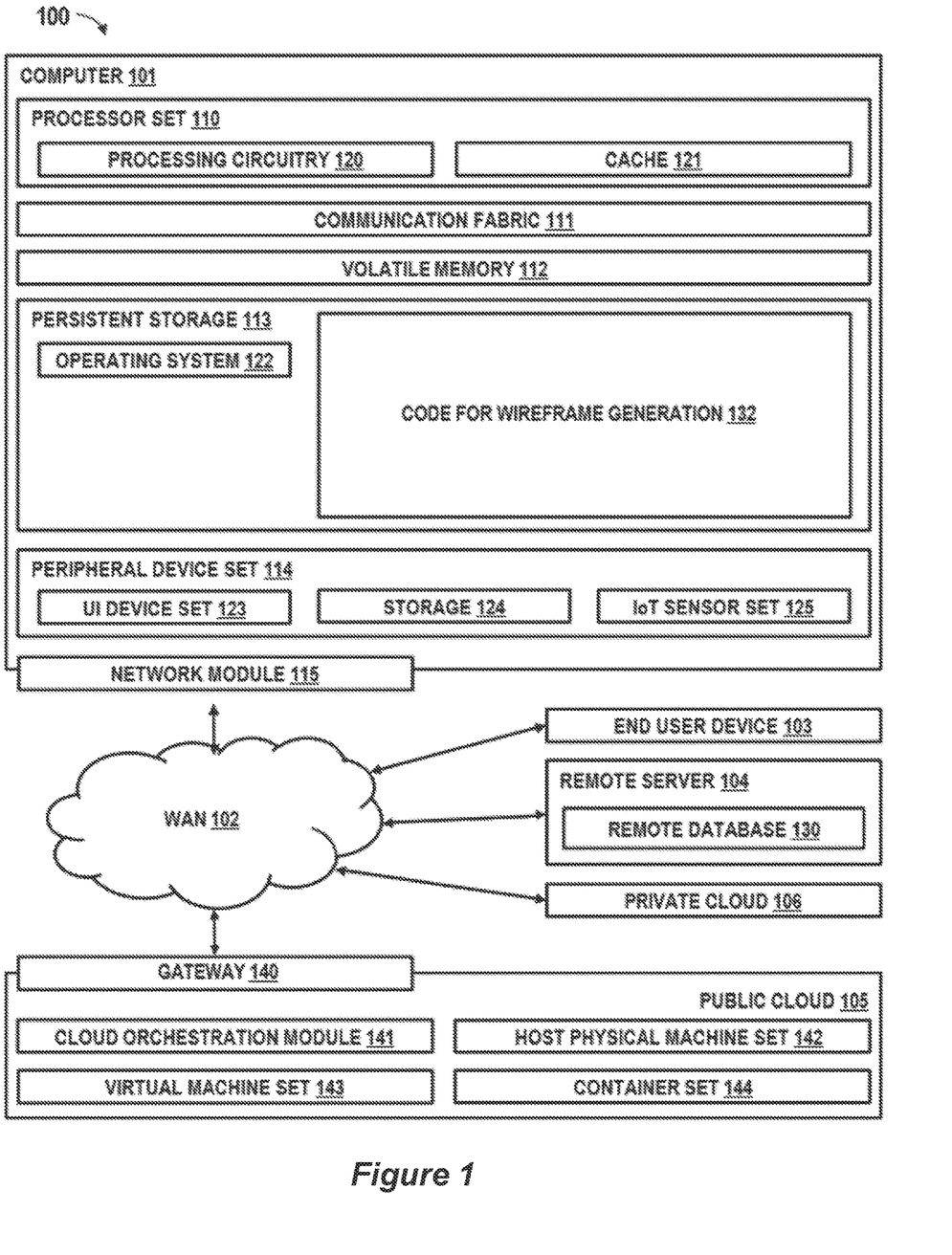
FIG. 1 depicts a computing environment according to an embodiment of the present invention.

Referring now to FIG. 1, a schematic of an example of a computing environment 100 is shown.

The computing environment 100 contains an example of an environment for the execution of at least some of the computer code involved in performing the inventive methods, such as code for wireframe generation 132. In addition to block 132, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 132, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. The computer 101 may be located in a cloud, even though it is not shown in a cloud in FIG. 1. On the other hand, the computer 101 is not required to be in a cloud except to any extent as may be affirmatively indicated.

The processor set 110 includes one, or more, computer processors of any type now known or to be developed in the future. The processing circuitry 120 may be distributed over multiple packages, for example, multiple, coordinated integrated circuit chips. The processing circuitry 120 may implement multiple processor threads and/or multiple processor cores. The cache 121 is memory that is located in the processor chip package(s) and is typically used for data or code that should be available for rapid access by the threads or cores running on the processor set 110. Cache memories are typically organized into multiple levels depending upon relative proximity to the processing circuitry. Alternatively, some, or all, of the cache 121 for the processor set may be located "off chip." In some computing environments, the processor set 110 may be designed for working with qubits and performing quantum computing.

Computer readable program instructions are typically loaded onto the computer 101 to cause a series of operational steps to be performed by the processor set 110 of the computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 121 and the other storage media discussed below. The program instructions, and associated data, are accessed by the processor set 110 to control and direct performance of the inventive methods. In the computing environment 100, at least some of the instructions for performing the inventive methods may be stored in the block 132 in the persistent storage 113.

The communication fabric 111 is the signal conduction paths that allow the various components of the computer 101 to communicate with each other. Typically, the communication fabric 111 is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 112 is any type of volatile memory now known or to be developed in the future. Examples include dynamic type random access memory (RAM) or static type RAM. Typically, the volatile memory is characterized by random access, but this is not required unless affirmatively indicated. In the computer 101, the volatile memory 112 is located in a single package and is internal to the computer 101, but, alternatively or additionally, the volatile memory 112 may be distributed over multiple packages and/or located externally with respect to the computer 101.

The persistent storage 113 is any form of non-volatile storage for computers that is now known or to be developed in the future. The non-volatility of the persistent storage 113 means that the stored data is maintained regardless of whether power is being supplied to the computer 101 and/or directly to the persistent storage 113. The persistent storage 113 may be a read only memory (ROM), but typically at least a portion of the persistent storage allows writing of data, deletion of data and re-writing of data. Some familiar forms of persistent storage include magnetic disks and solid state storage devices. The operating system 122 may take several forms, such as various known proprietary operating systems or open source Portable Operating System Interface type operating systems that employ a kernel. The code included in block 132 typically includes at least some of the computer code involved in performing the inventive methods.

The peripheral device set 114 includes a set of peripheral devices of computer 101. Data communication connections between the peripheral device set 114 and the other components of the computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, the UI device set 123 may include components such as a display screen, speaker, microphone, wearable devices (such as goggles and smart watches), keyboard, mouse, printer, touchpad, game controllers, and haptic devices. The storage 124 is external storage, such as an external hard drive, or insertable storage, such as an SD card. The storage 124 may be persistent and/or volatile. In some embodiments, the storage 124 may take the form of a quantum computing storage device for storing data in the form of qubits. In embodiments where the computer 101 is required to have a large amount of storage (for example, where the computer 101 locally stores and manages a large database) then this storage may be provided by peripheral storage devices designed for storing very large amounts of data, such as a storage area network (SAN) that is shared by multiple, geographically distributed computers. The IoT sensor set 125 is made up of sensors that can be used in Internet of Things applications. For example, one sensor may be a thermometer and another sensor may be a motion detector.

The network module 115 is a collection of computer software, hardware, and firmware that allows the computer 101 to communicate with other computers through the WAN 102. The network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 115 are performed on the same physical hardware device. In other embodiments (for example, embodiments that utilize software-defined networking (SDN)), the control functions and the forwarding functions of the network module 115 are performed on physically separate devices, such that the control functions manage several different network hardware devices. Computer readable program instructions for performing the inventive methods can typically be downloaded to the computer 101 from an external computer or external storage device through a network adapter card or network interface included in the network module 115.

The WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

The End User Device (EUD) 103 is any computer system that is used and controlled by an end user (for example, a customer of an enterprise that operates the computer 101) and may take any of the forms discussed above in connection with the computer 101. The EUD 103 typically receives helpful and useful data from the operations of the computer 101. For example, in a hypothetical case where the computer 101 is designed to provide a recommendation to an end user, this recommendation would typically be communicated from the network module 115 of the computer 101 through the WAN 102 to the EUD 103. In this way, the EUD 103 can display, or otherwise present, the recommendation to an end user. In some embodiments, the EUD 103 may be a client device, such as thin client, heavy client, mainframe computer, desktop computer and so on.

The remote server 104 is any computer system that serves at least some data and/or functionality to the computer 101. The remote server 104 may be controlled and used by the same entity that operates the computer 101. The remote server 104 represents the machine(s) that collect and store helpful and useful data for use by other computers, such as the computer 101. For example, in a hypothetical case where the computer 101 is designed and programmed to provide a recommendation based on historical data, then this historical data may be provided to the computer 101 from the remote database 130 of the remote server 104.

The public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 105 is performed by the computer hardware and/or software of the cloud orchestration module 141. The computing resources provided by the public cloud 105 are typically implemented by virtual computing environments that run on various computers making up the computers of the host physical machine set 142, which is the universe of physical computers in and/or available to the public cloud 105. The virtual computing environments (VCEs) typically take the form of virtual machines from the virtual machine set 143 and/or containers from the container set 144. It is understood that these VCEs may be stored as images and may be transferred among and between the various physical machine hosts, either as images or after instantiation of the VCE. The cloud orchestration module 141 manages the transfer and storage of images, deploys new instantiations of VCEs and manages active instantiations of VCE deployments. The gateway 140 is a collection of computer software, hardware, and firmware that allows the public cloud 105 to communicate through the WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 106 is similar to the public cloud 105, except that computing resources are only available for use by a single enterprise. While the private cloud 106 is depicted as being in communication with the WAN 102, in other embodiments a private cloud 106 may be disconnected from the internet entirely and only accessible through a local/private network. A hybrid cloud is a composition of multiple clouds of different types (for example, private cloud 106, community or public cloud 105 types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 105 and the private cloud 106 are both part of a larger hybrid cloud.

Figure 2:
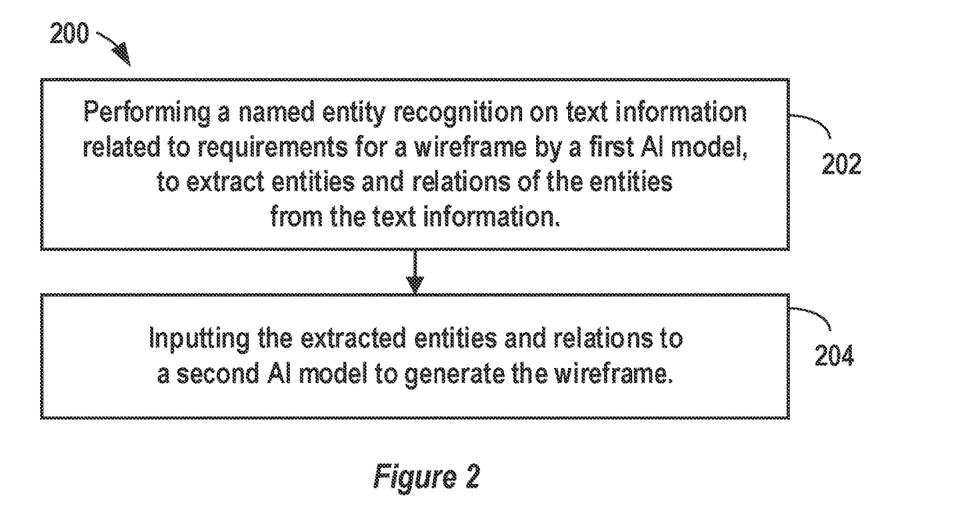
FIG. 2 depicts a flow chart showing an exemplary computer-implemented method for wireframe generation according to an embodiment of the present disclosure.
Figure 3:
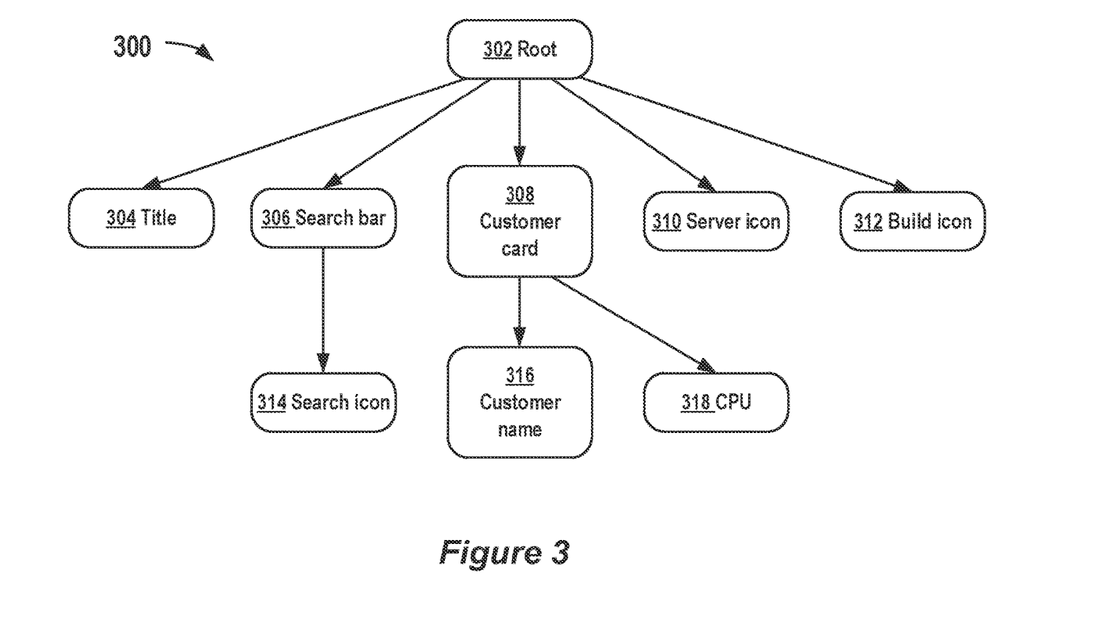
FIG. 3 depicts an exemplary tree-structured data generated by the first AI model according to an embodiment of the present disclosure.
Figure 4:
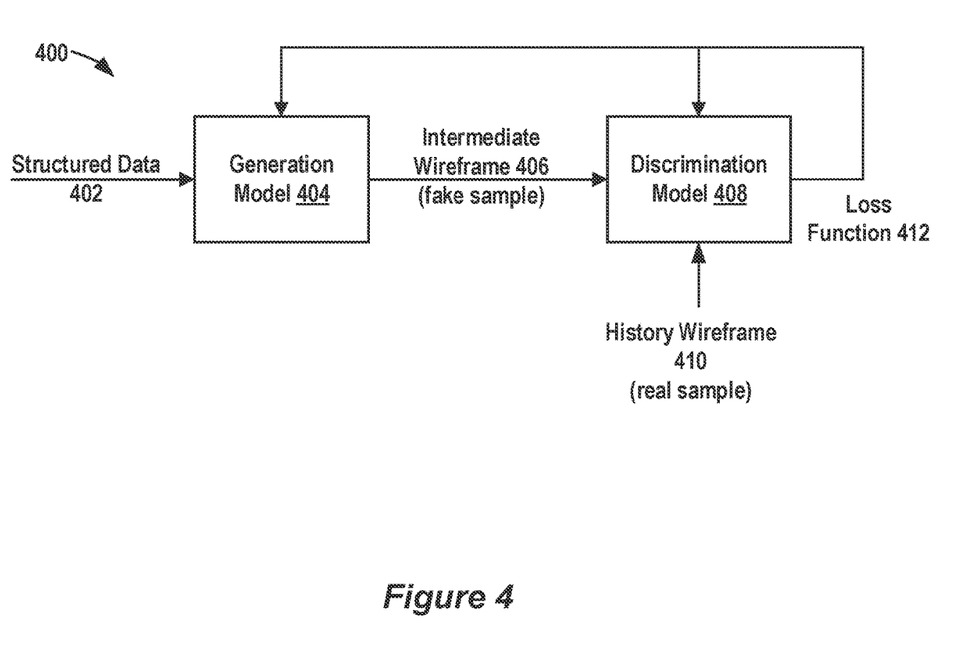
FIG. 4 depicts an exemplary diagram showing a training process of the second AI model according to an embodiment of the present disclosure.

With reference now to FIGS. 2 to 4, some embodiments of the present disclosure will be described below.

A wireframe generation is a necessary process before starting to design a UI. The wireframe may be a design layout that serves one or more of the following purposes: it presents the information that will be displayed on the UI; it gives an outline of structure and layout of the UI; it conveys the overall direction and description of the UI. It is noted that the wireframe discussed herein may include other elements according to actual design needs. In addition, the UI discussed herein may be a webpage, a graphical user interface or any other interoperable interface.

The wireframe generation may need a lot of discussion and revisions to meet the customer's requirements, and the designers cannot start to create the UI until the finish of the wireframe. Further, although there are many products for designers to facilitate the UI design process, most of them focus on the interface creation and cannot benefit the process from analysis to wireframe generation, which is mainly completed manually and consumes huge resources.

Therefore, there is a need to provide a scheme for automatically generating a well-organized wireframe which meets customer requirements.

Now refer to FIG. 2, which depicts a flow chart showing an exemplary computer-implemented method 200 for wireframe generation according to an embodiment of the present disclosure.

In some embodiments, in S202, one or more processing units may perform a named entity recognition (NER) on text information related to requirements for a wireframe by a first artificial intelligence (AI) model, to extract entities and relations of the entities from the text information.

The requirements for the wireframe may be obtained from a customer who have entrusted the UI design. Further, the customer requirements may include backgrounds, context, goals or any other specific requirements for the UI. The customer requirements may be recorded in the form of text information, e.g., input by the customer himself or gathered from the customer by the designer.

An NER may be performed on the text information related to the requirements for the wireframe by the first AI model. The NER is a natural language processing (NLP) technique that automatically identifies named entities in a text. In this disclosure, entities to be extracted from the text information may be a title, an icon, a search box or any other elements necessary for the UI. In addition to identify entities in the text information, the NER may also extract relations of the entities, which may refer to the dependency relationship between entities, such as the specified location relationship between entities.

The following is an exemplary text information related to customer requirements for a wireframe.

---

1. Need a title: Client TTA Servers List
2. Need a search bar with a search icon
3. Need multiple customer cards with customer name and CPU data in them
4. Need Server and Build icons

---

The NER may be performed on the above text information to extract entities and relations of the entities. The following relation-entity Table 1 shows the extracted entities and relations. There are nine entities extracted from the text information. Further, the corresponding relations "i" "with" and "in" ~ are extracted from the text information.

TABLE 1

|   | Entities | Relations |
|---|----------|-----------|
| 1 | Title | Entity 1 "is" entity 2 |
| 2 | Client TTA Servers List | |
| 3 | Search bar | Entity 3 "with" entity 4 |
| 4 | Search icon | |
| 5 | Customer cards | Entity 6 "in" entity 5 |
| 6 | Customer name | Entity 7 "in" entity 5 |
| 7 | CPU data | |
| 8 | Server icon | |
| 9 | Build icon | |

By extracting entities and their relations from the text information, the text information is reorganized into a structured data indicating entities and their internal dependencies, which may facilitate subsequent processing in wireframe generation.

In this disclosure, there is no template requirements for the text information as the input of the first AI. For example, it is not required to identify which text information indicates a title, which text information indicates a search icon. This is because the NER is performed on the text information to extract entities and their relations automatically. Further, in this disclosure, in addition to the entities, the relations of the entities are further extracted from the text information, which may better reflect customer requirements and thus facilitate the generation of wireframe in a more accurate and customer-satisfying way.

In some embodiments, the structured data including the entities and their relations may by expressed in a tree structure to be shown to the designer intuitively. FIG. 3 depicts an exemplary tree-structured data 300 generated by the first AI model according to an embodiment of the present disclosure. The tree-structured data 300 may correspond to the above Table 1.

As can be seen from FIG. 3, the entities are expressed as nodes 304~318 of the tree under the root node 302, and the relations of the entities are expressed by connections of the nodes. Node 302 is the root node 302. Node 304 is the title entity, entity 1. The client TTA servers list, entity 2 is the same as the title entity, entity 1, node 304. Node 306 is the search bar, entity 3. Node 314 is the search icon, entity 4. Node 308 is the customer card, entity 5. Node 316 is the customer name, entity 6. Node 318 is the CPU data, entity 7. Node 310 is the server icon, entity 8. Node 312 is the build icon, entity 9.

For example, entity 3 "search bar" is expressed as node 306, and entity 4 "search icon" is expressed as node 314, and the relation "with" between entity 3 "search bar" node 306 and entity 4 "search icon" node 314 is expressed by a line from node 306 to node 314, denoting that node 314 is a child node of node 306. Further, relations between entity 5 "customer card" node 308, entity 6 "customer name" node 316 and entity 7 "CPU data" node 318, are similarly expressed in the tree structure of FIG. 3. As for the relation "is" between entity 1 "title" node 304 and entity 2 "client TTA servers list", since the relation indicates equivalence of the two entities, only entity 1 is expressed as node 304 in the tree structure, while entity 2 "client TTA servers list" is omitted and may be recorded as an attribute of node 304.

It is noted that any existing NER technology may be applied in S202 to extract entities and their relations from the text information. For example, pipeline NER may be applied in which one model is used for extracting entities and another model is used for extracting relations of the entities. Alternatively, a joint entity recognition and relation extraction may be applied, in which a single model may be used to jointly extract the entities and their relations. The joint entity recognition and relation extraction may be able to reduce error accumulation and saving computing resources compared to pipeline NER.

It is further noted that the first AI model used for performing the NER may be any existing AI model such as a neural network model. The first AI model may be trained in advance using predefined training dataset for NER. The training process of the first AI model is not limited herein.

In some embodiments, the first AI model may include a bidirectional neural network model. Since contextual information of the text information may have influence on the extraction of the entities and their relations, a bidirectional neural network model may be used as the first AI model, which may make the neural network to have sequence information in both directions of backward (future to past) and forward (past to future). By using the bidirectional neural network model as the first AI model, the contextual information of the text information may be considered more sufficiently when performing the NER. Exemplary bidirectional neural network model may include but not limited to bidirectional long short-term memory (Bi-LSTM) and bidirectional recurrent neural network (Bi-RNN).

In some embodiments, the extracted relations may be further classified into an inclusion relation and a juxtaposition relation. The inclusion relation may indicate a hierarchical structure of two entities. For example, an inclusion relation between a first entity and a second entity may indicate that the first entity in a first page of the wireframe links to the second entity in a second page of the wireframe. Further, the juxtaposition relation may indicate relations other than the inclusion relation. For example, a color, a size or other attribute of one entity may be identified as another entity having a juxtaposition relation with the one entity.

The further classification of the extracted relations may be especially useful in the case that the wireframe to be designed has a multi-page layout, because it may help to clarify the hierarchical structure of entities in different pages and facilitate the generation of the wireframe.

Referring back to FIG. 2, in S204 of method 200, one or more processing units may input the extracted entities and relations from S202 to a second AI model to generate the wireframe. The second AI model may be trained so that a difference between resultant relations of the entities of the generated wireframe and the extracted relations of the entities from the first AI model is decreased.

In some embodiments, the second AI model may include a generative adversarial network (GAN). GAN is an unsupervised learning task that involves automatically discovering and learning the regularities or patterns in input data. After training, GAN can generate new examples that follow the rules and styles of the training dataset.

In this disclosure, GAN may comprise a generation model for generating the wireframe and a discrimination model for discriminating whether the generated wireframe is well-organized and meet's the customer's requirements. Next, a training process of GAN 400 may be explained in detail with reference to FIG. 4.

As shown in FIG. 4, generative adversarial network (GAN) 400 includes a generation model 404 and a discrimination model 408. Structured data 402 is input to the generation model 404. The structured data 402 may include the entities and their relations extracted in S202.

The structured data 402 may be expressed in a form of sequence. For the entities included in the structured data 402, the types of the entities may be determined first. In some embodiments, the types of a plurality of entities may be defined in advance. For example, a component library may be prepared that provides associations of each entity and its type. For example, for entity 1 "title", it may be associated with an entity type P=1 in the component library. For entity 3 "search bar", it may be associated with an entity type P=2 in the component library. By referring to the component library, the types of the entities may be determined.

In some embodiments, the relations of entities may be represented by the following relation matrix M, wherein k is the number of entities and $m_{ij}$ describes the relation between entity i and entity j. Further, for an entity i, $M_i=[m_{i1}, m_{i2}, \ldots, m_{ik}]$ describes the relation of entity i with other entities.

$$M = \begin{bmatrix} m_{11} & \cdots & m_{1k} \\ \vdots & \ddots & \vdots \\ m_{k1} & \cdots & m_{kk} \end{bmatrix}$$

In some embodiments, the categories of relations of entities may be defined in advance. For example, for positional relations, "0" may represent no dependency, "1" may represent internal, "2" may represent above, and "3" may represent below. For example, as can be seen from Table 1, entity 6 "customer name" is "in" entity 5 "customer cards", and thus the relation $m_{76}$ may equal to "1" which describes a relation of internal.

It is noted that the above positional relations are examples, and other relations may be defined. For example, the relations "is", "with" shown in Table 1 may be defined. Accordingly, the relation matrix M may be determined according to the categories of relations of entities.

In some cases, there is a possibility that no explicit description is included in the text information, so that for two entities extracted from the text information, they have no extracted relation therebetween. For example, for entity 1 "title" and entity 3 "search bar" in Table, 1, there is no relation therebetween. In this case, in some embodiments, for entity i and entity j extracted from the text information having no extracted relation therebetween, a randomly generated relation $m_{ij}$ between entity i and entity j may be input to the second AI model. The resultant relation $m_{ij}$ between entity i and entity j may be learned by the second AI model. For example, the second AI model may learn that entity 3 "search bar" is positioned below entity 1 "title" after proper training.

Based on the above sequence form of entities and their relations, the structured data 402 may be expressed in the form of sequence as $\Phi=\{(P_1, M_1), (P_2, M_2), \ldots, (P_k, M_k)\}$, wherein k is the number of entities and $(P_i, M_i)$ describes entity i with entity type $P_i$ and relation $M_i$.

In some embodiments, some attributes of the entity may be represented together with the entity type. For example, for entity i, $P_i=(p_{1i}, p_{2i})$ may be denoted, wherein $p_{1i}$ describes the entity type of entity i, and $p_{2i}$ describes the shape of the entity i. The shape of each predefined entity type may be stored in association with each entity type in the component library. When the entity type of entity i is determined, the corresponding shape may also be determined. Similarly, in addition to the shape of entity, other attributes of the entity, such as size, color, may also be represented together with the entity type by referring to the component library in which pre-defined attributes of entities are stored in association with respective entity types. Alternatively, the attributes of entities may be randomly generated and included in the structured data 402. The generation model 404 may output the attributes of entities by learning from training data.

In some embodiments, the structured data 402 may further include positions and/or styles of the entities. For example, a position of an entity i may be represented as $\theta_i=(x_{1i}, y_{1i}, x_{2i}, y_{2i})$, wherein $(x_{1i}, y_{1i})$ describes the up-left position of the entity i in the wireframe, and $(x_{2i}, y_{2i})$ describes the right-down position of the entity i in the wireframe. Since positions of entities are usually unknown when initially inputting the structured data 402, the positions of entities may be randomly generated. The generation model 404 may output the positions of entities by learning from training data.

For styles of the entities, such as different themes to be displayed with the entities, it may also be randomly generated. The generation model 404 may output the positions of entities by learning from training data. Alternatively, the styles of for respective entity types may be pre-defined and stored in the component library.

The structured data 402 including entities P, positions θ, relations M and styles S may be represented as $\Phi=\{(P_1, M_1, \theta_1, S_1), (P_2, M_2, \theta_2, S_2), \ldots, (P_k, M_k, \theta_k, S_k)\}$.

The generation model 404 will use the structured data 402 to generate an intermediate wireframe 406, which will be input to the discrimination model 408 as a fake sample for training the discrimination model 408.

In some embodiments, instead of inputting the generated intermediate wireframe 406 in graphic format directly, the intermediate wireframe 406 to be input to the discrimination model 408 may be represented as a matrix including a plurality of sequences, each sequence indicates an entity and relations between the entity and other entities of the intermediate wireframe. For example, the matrix of the intermediate wireframe 406 may be expressed as $$\Pi = \begin{bmatrix} seq_1 \\ seq_2 \\ \vdots \\ seq_k \end{bmatrix}$$

wherein $seq_i=(P_i, \theta_i, S_i)$, k is the number of entities. Further, since the generated position $\theta_i$ may accurately describe the position of entity i and the positional relations with other entities, the relation $M_i$ may be omitted in $seq_i$ if there are only positional relation in $M_i$. Further, if the relation $M_i$ describes other relations than the positional relations, $M_i$ may be added in $seq_i$.

By representing the generated intermediate wireframe 406 in the form of matrix, information in the wireframe may be better transformed because it may avoid influences caused by overlap between entities compared to the case that the wireframe is represented in a graphic format.

In some embodiments, the discrimination model may include a text convolutional neural network (textCNN) for the processing of the generated intermediate wireframe 406 in matrix form. In the case of using the textCNN, k in matrix II may be regarded as the sequency length of the textCNN, and the length of $seq_i$ may be regarded as the embedding size of the textCNN.

In addition to the intermediate wireframe 406 as the fake sample, a history wireframe 410 is input to the discrimination model 408 as a real sample. The history wireframe 410 may be prestored realistic wireframes. The intermediate wireframe 406 (fake sample) and the history wireframe 410 (real sample) may be used for training the discrimination model 408 so that the discrimination model 408 will learn to distinguish the fake data from real data. In some embodiments, the history wireframe 410 may be represented in matrix form similar as the intermediate wireframe 406 and to be input to the textCNN.

Further, a loss function 412 of the discrimination model 408 may be calculated. The generation model 404 and the discrimination model 408 may be updated based on the loss function 412.

In some embodiments, the loss function 412 may be determined based on two parts.

One part is a loss of an output of the discrimination model 408, which may be a cross entropy loss determined based on the discrimination result of the discrimination model 408 and the labeled training data (fake sample or real sample). The loss of the output of the discrimination model 408 may reflect whether the intermediate wireframe generated by the generation model 404 is well-organized, such as whether the intermediate wireframe is disordered or arranged in good order.

The other part of the loss function 412 is a difference L between relations of the entities of the intermediate wireframe and the extracted relations of the entities from the first AI model. The difference L may be expressed by the following equation, wherein M is the relation matrix included in the structured data 402, and M' is the relation matrix of the intermediate wireframe generated by the generation model 404, and $\|\cdot\|_F$ denotes the Frobenius norm of matrix.

The difference may reflect whether the intermediate wireframe generated by the generation model meets customer's requirements. The lower the difference, the closer the intermediate wireframe to the customer's requirements.

By training the GAN 400 with the loss function 412 determined on the two parts, the intermediate wireframe generated by the generation model 404 may be well-organized and meets the customer's requirements. After the training, the generation model 404 of the GAN 400 may be used to generate the wireframe by inputting structured data extracted by the first AI model in S202.

It is noted that the GAN 400 is an example of the second AI model, and other AI model such as other neural network model may be applied as the second AI model, so long as it is trained to decrease a difference between resultant relations of the entities of the generated wireframe and the extracted relations of the entities from the first AI model.

It should be noted that the processing of wireframe generation according to embodiments of this disclosure could be implemented by computer 101 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present disclosure, there is provided a system for wireframe generation. The system may comprise one or more processing units and a memory coupled to at least one of the one or more processing units. The system may further comprise a set of computer program instructions stored in the memory and executed by at least one of the one or more processing units in order to perform actions including performing a named entity recognition on text information related to requirements for a wireframe by a first artificial intelligence (AI) model, so as to extract entities and relations of the entities from the text information. The actions may further include inputting the extracted entities and relations to a second AI model to generate the wireframe, wherein the second AI model is trained so that a difference between resultant relations of the entities of the generated wireframe and the extracted relations of the entities from the first AI model is decreased.

According to an embodiment of the present disclosure, there is provided a computer program product. The computer program product may comprise a computer readable storage medium having program instructions embodied therewith. The program instructions may be executable by a device to perform a method. The method may comprise performing a named entity recognition on text information related to requirements for a wireframe by a first artificial intelligence (AI) model, so as to extract entities and relations of the entities from the text information. The method may further comprise inputting the extracted entities and relations to a second AI model to generate the wireframe, wherein the second AI model is trained so that a difference between resultant relations of the entities of the generated wireframe and the extracted relations of the entities from the first AI model is decreased.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for wireframe generation, comprising:
   performing, by one or more processing units, a named entity recognition on text information related to requirements for a wireframe by a first artificial intelligence (AI) model, to extract a set of entities and relationships between each of the entities of the set of entities from the text information; and
   inputting, by the one or more processing units, the set of entities and relationships between each of the entities of the set of entities to a second AI model to generate the wireframe, wherein the second AI model is trained so that a difference between resultant relations of the set of entities of the generated wireframe and the relationships between each of the entities of the set of entities from the first AI model is decreased.

2. The computer-implemented method of claim 1, wherein the relationships between each of the entities of the set of entities are classified into an inclusion relation and a juxtaposition relation, wherein an inclusion relation between a first entity of the set of entities and a second entity of the set of entities indicates that the first entity in a first page of the wireframe links to the second entity in a second page of the wireframe, and the juxtaposition relation indicates relations other than the inclusion relation.

3. The computer-implemented method of claim 1, wherein for a third entity of the set of entities and a fourth entity of the set of entities extracted from the text information having no extracted relation therebetween, a randomly generated relation between the third entity and the fourth entity is input to the second AI model, and wherein the resultant relation between the third entity and the fourth entity is learned by the second AI model.

4. The computer-implemented method of claim 1, wherein the first AI model comprises a bidirectional neural network model.

5. The computer-implemented method of claim 1, wherein the second AI model comprises a generative adversarial network (GAN) comprising a generation model and a discrimination model, and wherein the training of the second AI model comprises:

inputting the set of entities and relationships between each of the entities of the set of entities to the generation model to generate an intermediate wireframe;
   inputting the intermediate wireframe as a fake sample to the discrimination model and inputting a history wireframe as a real sample to the discrimination model;
   calculating a loss function of the discrimination model based on a loss of an output of the discrimination model and a difference between relationships between each of the entities of the set of entities of the intermediate wireframe and the extracted relationships between each of the entities of the set of entities from the first AI model; and
   modifying the generation model and the discrimination model based on the loss function.

6. The computer-implemented method of claim 5, wherein the discrimination model comprises a text convolutional neural network (textCNN), and wherein the intermediate wireframe to be input to the textCNN is represented as a matrix including a plurality of sequences, each sequence indicates an entity of the set of entities and a set of relationships between the entity of the set of entities and every other entity of the set of entities of the intermediate wireframe.

7. The computer-implemented method of claim 1, wherein randomly generated positions and/or styles of extracted entities of the set of entities are input to the second AI model to generate the wireframe with positions and/or styles of the set of entities learned by the second AI model.

8. A computer system for wireframe generation, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   performing, by one or more processing units, a named entity recognition on text information related to requirements for a wireframe by a first artificial intelligence (AI) model, to extract a set of entities and relationships between each of the entities of the set of entities from the text information; and
   inputting, by the one or more processing units, the set of entities and relationships between each of the entities of the set of entities to a second AI model to generate the wireframe, wherein the second AI model is trained so that a difference between resultant relations of the set of entities of the generated wireframe and the relationships between each of the entities of the set of entities from the first AI model is decreased.

9. The computer system of claim 8, wherein the relationships between each of the entities of the set of entities are classified into an inclusion relation and a juxtaposition relation, wherein an inclusion relation between a first entity of the set of entities and a second entity of the set of entities indicates that the first entity in a first page of the wireframe links to the second entity in a second page of the wireframe, and the juxtaposition relation indicates relations other than the inclusion relation.

10. The computer system of claim 8, wherein for a third entity of the set of entities and a fourth entity of the set of entities extracted from the text information having no extracted relation therebetween, a randomly generated relation between the third entity and the fourth entity is input to the second AI model, and wherein the resultant relation between the third entity and the fourth entity is learned by the second AI model.

11. The computer system of claim 8, wherein the first AI model comprises a bidirectional neural network model.

12. The computer system of claim 8, wherein the second AI model comprises a generative adversarial network (GAN) comprising a generation model and a discrimination model, and wherein the training of the second AI model comprises:
  inputting the set of entities and relationships between each of the entities of the set of entities to the generation model to generate an intermediate wireframe;
  inputting the intermediate wireframe as a fake sample to the discrimination model and inputting a history wireframe as a real sample to the discrimination model;
  calculating a loss function of the discrimination model based on a loss of an output of the discrimination model and a difference between relationships between each of the entities of the set of entities of the intermediate wireframe and the extracted relationships between each of the entities of the set of entities from the first AI model; and
  modifying the generation model and the discrimination model based on the loss function.

13. The computer system of claim 12, wherein the discrimination model comprises a text convolutional neural network (textCNN), and wherein the intermediate wireframe to be input to the textCNN is represented as a matrix including a plurality of sequences, each sequence indicates an entity of the set of entities and a set of relationships between the entity of the set of entities and every other entity of the set of entities of the intermediate wireframe.

14. The computer system of claim 8, wherein randomly generated positions and/or styles of extracted entities of the set of entities are input to the second AI model to generate the wireframe with positions and/or styles of the set of entities learned by the second AI model.

15. A computer program product for wireframe generation, comprising:
  performing, by one or more processing units, a named entity recognition on text information related to requirements for a wireframe by a first artificial intelligence (AI) model, to extract a set of entities and relationships between each of the entities of the set of entities from the text information; and
  inputting, by the one or more processing units, the set of entities and relationships between each of the entities of the set of entities to a second AI model to generate the wireframe, wherein the second AI model is trained so that a difference between resultant relations of the set of entities of the generated wireframe and the relationships between each of the entities of the set of entities from the first AI model is decreased.

16. The computer program product of claim 15, wherein the relationships between each of the entities of the set of entities are classified into an inclusion relation and a juxtaposition relation, wherein an inclusion relation between a first entity of the set of entities and a second entity of the set of entities indicates that the first entity in a first page of the wireframe links to the second entity in a second page of the wireframe, and the juxtaposition relation indicates relations other than the inclusion relation.

17. The computer program product of claim 15, wherein for a third entity of the set of entities and a fourth entity of the set of entities extracted from the text information having no extracted relation therebetween, a randomly generated relation between the third entity and the fourth entity is input to the second AI model, and wherein the resultant relation between the third entity and the fourth entity is learned by the second AI model.

18. The computer program product of claim 15, wherein the second AI model comprises a generative adversarial network (GAN) comprising a generation model and a discrimination model, and wherein the training of the second AI model comprises:
  inputting the set of entities and relationships between each of the entities of the set of entities to the generation model to generate an intermediate wireframe;
  inputting the intermediate wireframe as a fake sample to the discrimination model and inputting a history wireframe as a real sample to the discrimination model;
  calculating a loss function of the discrimination model based on a loss of an output of the discrimination model and a difference between relationships between each of the entities of the set of entities of the intermediate wireframe and the extracted relationships between each of the entities of the set of entities from the first AI model; and
  modifying the generation model and the discrimination model based on the loss function.

19. The computer program product of claim 18, wherein the discrimination model comprises a text convolutional neural network (textCNN), and wherein the intermediate wireframe to be input to the textCNN is represented as a matrix including a plurality of sequences, each sequence indicates an entity of the set of entities and a set of relationships between the entity of the set of entities and every other entity of the set of entities of the intermediate wireframe.

20. The computer program product of claim 15, wherein randomly generated positions and/or styles of extracted entities of the set of entities are input to the second AI model to generate the wireframe with positions and/or styles of the set of entities learned by the second AI model.

* * * * *